N. T. WHEELOCK.
GAS BURNER.
APPLICATION FILED JAN. 4, 1921.
1,403,215.
Patented Jan. 10, 1922.
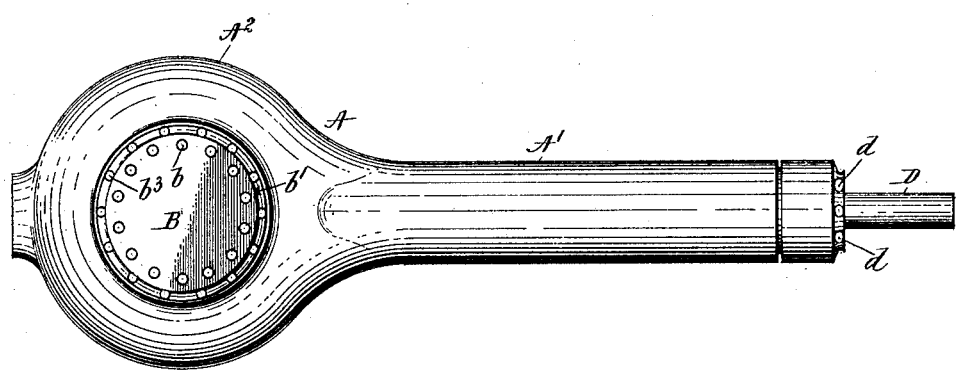
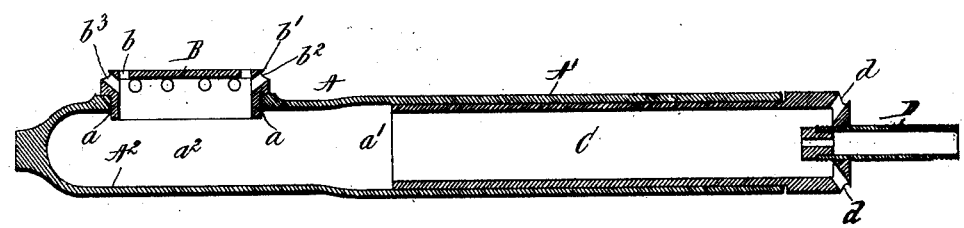
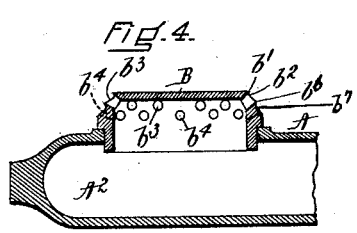
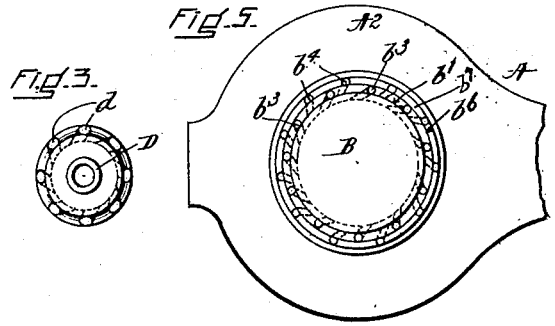
INVENTOR:
Nelson T. Wheelock
By
ATTORNEYS

UNITED STATES PATENT OFFICE.

NELSON T. WHEELOCK, OF FRAMINGHAM, MASSACHUSETTS.

GAS BURNER.

1,403,215.  Specification of Letters Patent.  Patented Jan. 10, 1922.

Application filed January 4, 1921. Serial No. 434,881.

*To all whom it may concern:*

Be it known that I, NELSON T. WHEELOCK, of Framingham, in the county of Middlesex and State of Massachusetts, a citizen of the United States, have invented a new and useful Improvement in Gas Burners, of which the following is a specification.

My invention relates to a new and useful improvement in gas burners for heating purposes, which is simple to make and provides opportunity for the thorough mixing of the gas and air and is an improvement upon any burner of this type of which I am aware, my burner enabling the gas and air to be thoroughly mixed before being delivered to the burner proper in a chamber which may be adjustable in size.

My invention will be understood by reference to the drawings, in which it is shown embodied in its preferred form.

Figure 1 is a plan view;

Fig. 2 a longitudinal section through Fig. 1;

Fig. 3 an end view showing the gas inlet, and

Fig. 4 a modification, in longitudinal section;

Fig. 5 being a plan view thereof.

A is a burner support which may be cast or otherwise constructed. It comprises a hollow shank $A^1$ open at one end, the other end of which is enlarged as at $A^2$, and closed in to form a supply chamber $a^2$ into which leads a mixing passage $a^1$. Into the opening $a$ in one wall of the supply chamber $a^2$ is preferably driven or otherwise fixed a burner B the top of which, preferably flat, is preferably provided with a series of openings $b$ for gas jets extending into the chamber $a^2$. The burner is provided about its periphery with a lip $b^1$ which overhangs a concave annular recess $b^2$ located just beneath it, having a series of perforations $b^3$ for gas jets which extend outwardly at an angle of approximately 45 degrees with the openings $b$ so that the gas jets passing out through the openings $b^3$ will be guided more or less by the lip $b^1$ and their flames will be separated from the flames of the gas jets passing out through the openings $b$. It will be seen therefore that the lip $b^1$ performs an important function in that it ensures a number of separate flames corresponding with the number of perforations in the burner.

Into the hollow shank $A^1$ slides a tube C closed at one end except for a central perforation in which the gas pipe D is fixed. About the closed end of the tube C are also a number of perforations $d$ to serve as air intakes, which are preferably arranged as shown (see Fig. 3), that is, at substantially a tangent to the inlet tube C, so that as the gas comes in through the pipe D and draws in air through the openings $d$ the air is given a spiral or swirling movement so that it readily and thoroughly mixes with the gas, thus forming a good mixture for combustion, more perfect than the mixture in any burner of which I am aware. The inner tube thus forms a mixing chamber and as the inner tube C may be moved longitudinally in the shank $A^1$, the mixing chamber may be adjusted in size so that the time of this mixing process may be lengthened or shortened as required by the character of the gas used and a mixture secured of the thoroughness desired. Moreover my structure allows the adjustment of the distance between the standpipes and the desired position in the stove.

This form of burner it will be seen is very simple and, as the principal part of it may be made by casting, it is very inexpensive. The openings $b^2$ in the burner itself may be arranged in any convenient way below the lip $b^1$ so that this lip may serve to separate the flames coming from the sides of the burner from those in the top of the burner. The openings $b$ and $b^3$ are preferably stagared with relation to each other, and are thus between each other in a vertical plane, as will be readily understood from Figs. 1 and 2, so that the flames or jets issuing from said openings will be separated from each other, as hereinbefore stated.

Instead of having perforations in the top of the burner or in addition thereto a second concave annular recess $b^7$ may be made below the first recess $b^2$ and a second peripheral set of openings $b^4$ provided for gas jets, a second lip $b^6$ being provided to separate the jets from $b^2$ from the gas jets from $b^4$, and either set of jets may be at an angle as in Figs. 4 and 5.

What I claim as my invention is:—

1. A gas burning device comprising a hollow body having a tubular extension projecting from one side thereof, a perforated burner proper fitted to said hollow body, a pipe fitted in said tubular extension and having a partially closed outer end provided with an annular series of inclined and tangentially arranged air-inlet openings, and a gas inlet pipe surrounded by said openings which cause the entering air to have a swirling movement as it enters the mixing chamber afforded by said first-named pipe.

2. A gas burning device comprising a hollow body having a tubular extension projecting from one side thereof, a burner proper fitted into the upper side of said body and having at its outer part two series of perforations, the perforations of one series being disposed in staggered relation to the perforations of the other series, a pipe adjustably fitting said tubular extension and having a partially closed outer end, and means for admitting air and gas into said pipe which affords an air and gas mixing chamber communicating with the chamber of said hollow body.

3. A gas burning device comprising a hollow body having a tubular extension projecting from one side thereof, a burner proper fitted into the upper side of said body and having at its outer part two series of perforations, the perforations of one series being disposed in staggered relation to the perforations of the other series, a pipe adjustably fitting said tubular extension and having a partially closed outer end having an annular series of tangentially arranged inlet perforations and a gas inlet pipe fitted into the end of said first-named pipe which affords an air and gas mixing chamber communicating with the chamber of said hollow body.

4. A gas burning device comprising a hollow body having a tubular extension projecting from one side thereof, a burner proper fitted into the upper side of said hollow body and having a circular series of perforations in its top, near its periphery, and a second series of perforations just below its top and arranged in staggered relation to said first-named perforations so that the perforations of said second series come between the said first-named perforations in a vertical plane, said burner proper having also an annular lip at its periphery above said second series of perforations which are inclined at an angle of approximately forty-five degrees to said first-named perforations, a pipe adjustably mounted in said tubular extension and having a partially closed outer end with an annular series of inclined air inlet perforations at the periphery of its end, a gas inlet pipe fitted into the end of said first-named pipe which affords an air and gas mixing chamber communicating with the chamber of said hollow body on which said burner proper is mounted.

NELSON T. WHEELOCK.